United States Patent [19]
McKnight et al.

[11] Patent Number: 5,682,702
[45] Date of Patent: Nov. 4, 1997

[54] COLLAPSIBLE BIRD DECOY

[76] Inventors: Craig T. McKnight, 119 Scott Ave., St. Louis, Mo. 63135-1614; Jon R. Blevins, 720 Palace Ct., St. Louis, Mo. 63135

[21] Appl. No.: 489,551

[22] Filed: Jun. 12, 1995

[51] Int. Cl.$^6$ .................................................. A01M 31/00
[52] U.S. Cl. .................................................. 43/3
[58] Field of Search .................................................. 43/2, 3

[56] References Cited

U.S. PATENT DOCUMENTS

| | | | |
|---|---|---|---|
| 735,314 | 8/1903 | Syms | 43/3 |
| 977,787 | 12/1910 | Davis | 43/3 |
| 1,083,882 | 1/1914 | Hindmarsh | 43/3 |
| 2,535,445 | 12/1950 | Miller | 43/3 |
| 2,536,338 | 1/1951 | Withey | 43/3 |
| 2,639,534 | 5/1953 | Stossel | 43/3 |
| 2,763,952 | 9/1956 | Bruce | 43/3 |
| 2,783,572 | 3/1957 | Rohan | 43/3 |
| 3,707,798 | 1/1973 | Tryon | 43/3 |
| 5,003,722 | 4/1991 | Berkley | 43/3 |
| 5,144,764 | 9/1992 | Peterson | 43/3 |

*Primary Examiner*—Kurt Rowan
*Attorney, Agent, or Firm*—Armstrong, Teasdale, Schlafly & Davis

[57] ABSTRACT

A collapsible bird decoy comprises a planar body panel, shaped like the side silhouette of the bird, and a top panel shaped like a top-silhouette of the bird. The body panel and the back panel are adapted to infit in mutually perpendicular planes to form a body which resembles the bird's body when viewed from the sides or above. A wing panel extends generally outwardly from each side of the body formed by interfitting the body panel and back panel. The wing panels are preferably pivotally mounted to the body panel to pivot between a storage position in which the wings extend along the axis of the body panel, and a use position in which the wings extend vertically upwardly and can flex downwardly and outwardly from the body.

6 Claims, 2 Drawing Sheets

COLLAPSIBLE BIRD DECOY

FIELD OF THE INVENTION

This invention relates to bird decoys, and in particular to a collapsible bird decoy.

BACKGROUND AND SUMMARY OF THE INVENTION

Decoys are routinely used in bird hunting to attract prey. To be effective, the decoys are made to look as realistic as possible. Preferably a decoy is three-dimensional to realistically depict a bird from multiple view points. A major disadvantage with three-dimensional decoys is their large size and bulk, which makes them difficult to transport and to store.

The present invention overcomes the problem of providing a life-like three-dimensional decoy that is compact and easy to transport and to store. Generally, the collapsible bird decoy of the present invention comprises a planar body panel, shaped like the side-silhouette of the bird, having at least a head and a tail, and a planar back panel, shaped like the top-silhouette of the bird. The body panel and the back panel are adapted to infit in mutually perpendicular planes to form a body which resembles the bird's body when viewed from the sides or above. The decoy further comprises two wings, each wing having a proximal end and a distal end. The proximal end of each wing is attached to the body formed by interfitting the body panel and back panel, and the wing is adapted to extend laterally outwardly. The proximal ends of the wings are preferably pivotally mounted to the body panel to pivot between a storage position in which the wings extend along the axis of the body panel, and a use position in which the wings extend vertically upwardly and can flex downwardly and outwardly from the body.

Thus, the decoy of the present invention is of simple, inexpensive construction. The decoy comprises just a few parts, which lie flat when not in use. Thus, in collapsed form it is compact, light weight, and easy to transport, yet it can be quickly and easily assembled into a realistic three-dimensional decoy. The panels forming the decoy interfit so that separate fasteners are not required. Thus there are no small parts that can be lost. Once assembled, the decoy realistically depicts the bird when viewed from the side or above. Moreover, the cantilevered wings are preferably flexible to move in the wind, contributing to the life-like appearance of the decoy.

These and other features and advantages will be in part apparent, and in part pointed out hereinafter.

BRIEF DESCRIPTION OF THE DRAWINGS

Corresponding reference numerals indicate corresponding parts throughout the several views of the drawings.

DETAILED DESCRIPTION OF THE PREFERRED EMBODIMENT

Figure 1:
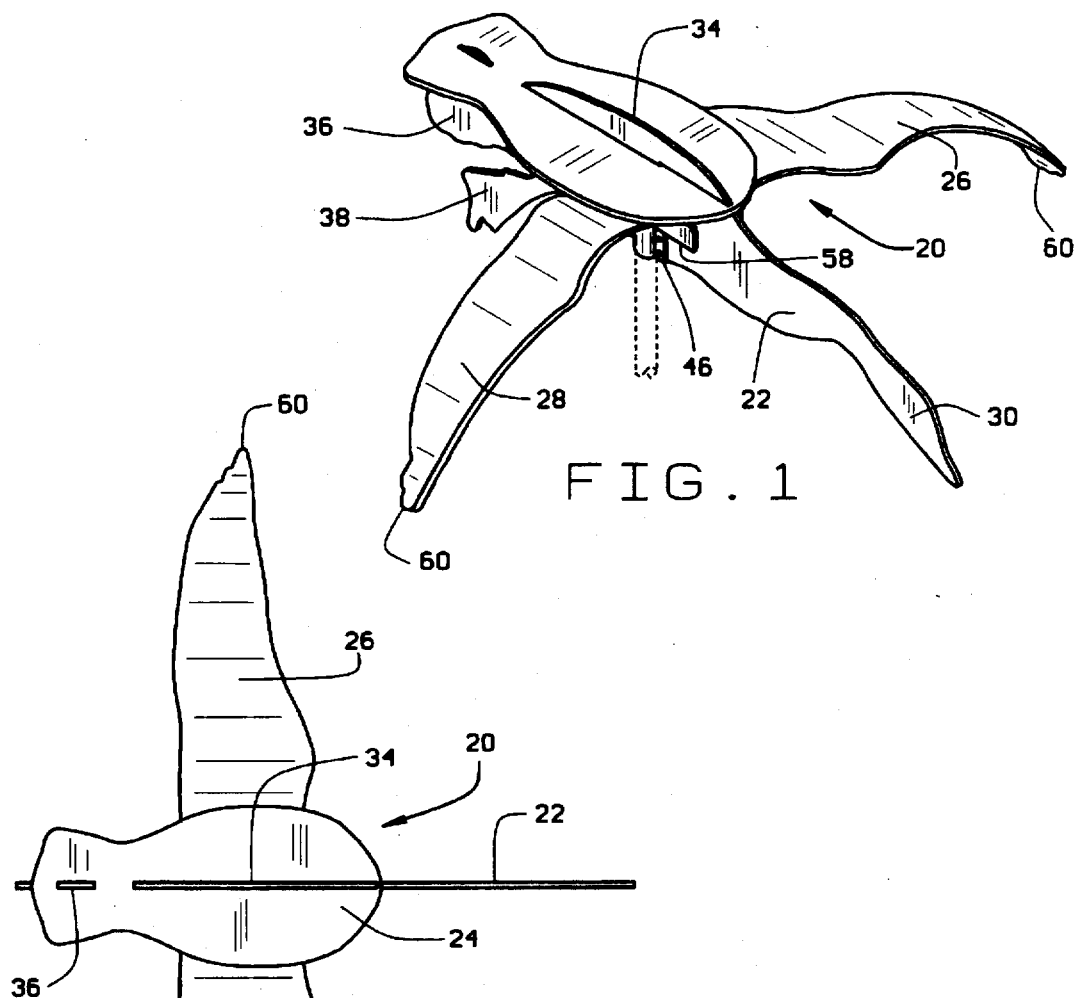
FIG. 1 is a perspective view of a collapsible bird decoy constructed according to the principles of this invention, shown fully assembled.
Figure 2:
FIG. 2 is a top plan view of the decoy shown fully assembled.
Figure 3:
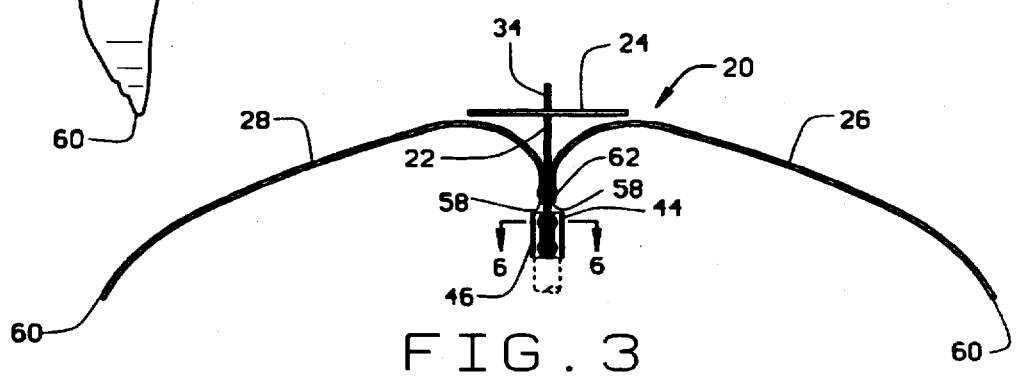
FIG. 3 is a front elevation view of the decoy shown fully assembled.

A collapsible bird decoy constructed according to the principles of this invention, indicated generally as 20 is shown fully assembled in FIGS. 1–3. The decoy 20 is constructed so that when it is fully assembled, it resembles a bird when viewed from the side or above. While the decoy 20 shown in the Figures is a goose, the invention is not so limited, and a decoy constructed according to the principles of this invention could be made in the form of a duck, or any other bird.

The decoy 20 comprises a body panel 22, a back panel 24, and two wing panels 26 and 28. The panels 22 and 24 are preferably thin, flat sheets of plastic, such as 0.060 inch high impact polystyrene sheet. The wing panels 26 and 28 are preferably thinner, to be more flexible that the body and back panels 22 and 24, and may be, for example, 0.040 inch high impact polystyrene sheet. The panels can be painted gray, or preferably, are realistically painted or colored to appear like the bird depicted by the decoy.

Figure 6:
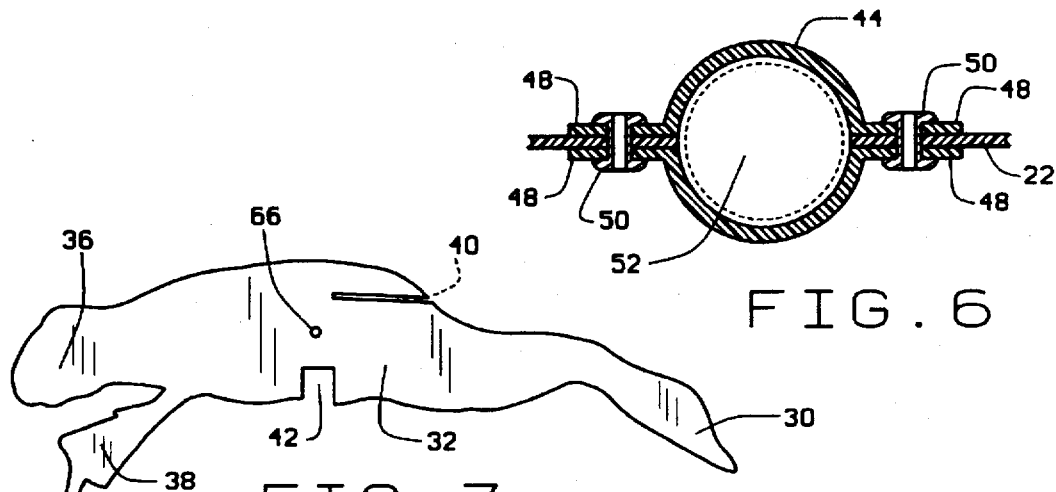
FIG. 6 is a horizontal cross-sectional view of the decoy taken along the plane of line 6—6 in FIG. 3.
Figure 7:
FIG. 7 is a side elevation view of the body panel.
Figure 7:

The body panel 22, shown best in FIG. 7, is shaped like the side-silhouette of the bird which the decoy depicts, and preferably includes a head 30, a torso 32 with a back 34, and a tail 36. The body panel 22 may also include feet 38. The body panel 22 also has a notch 40 extending inwardly from the forward end of the panel. The notch 40 is oriented so that it extends generally horizontally when the body panel is oriented in its upright use position. The body panel 22 also has a cutout 42 for receiving a mounting pole to mount the decoy 20 for use. As best shown in FIGS. 3 and 6, semi-cylindrical socket members 44 and 46 are mounted over the cutout 42, on opposite sides of body panel 22. The socket members 44 and 46 have flanges 48 that overlie the margins of the body panel surrounding the cutout. The socket members 44 and 46 are secured to the body panel, for example, with rivets 50. The socket members 44 and 46 form a socket 52 for receiving the end of the mounting pole, so that the decoy can be displayed above the ground in its proper orientation.

Figure 8:
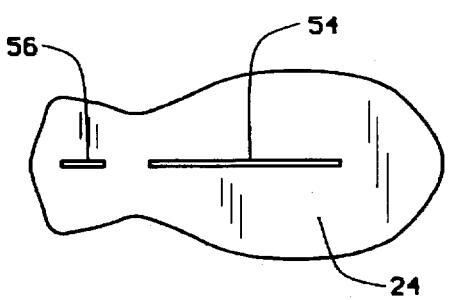
FIG. 8 is a top plan view of the back panel.

The back panel 24, shown best in FIG. 8, is shaped like the top-silhouette of the bird depicted by the decoy. The top panel has at least a back slot 54, and preferably also a tail slot 56, located along the central axis of the back panel. The body panel 22 and the back panel 24 are adapted to infit in mutually perpendicular planes to form a body which resembles the bird's body when viewed from the sides or above. The back slot 54 in the back panel 24 receives a portion of the back 34 of the body panel 22, and the notch 40 receives the portion of the back panel forward of the back slot 54. The depth of the notch 40 in the body panel 24 and the spacing of the slot 54 from the front edge of the back panel preferably correspond. The tail slot 56 is adapted to receive a portion of the tail 36.

Figure 4:
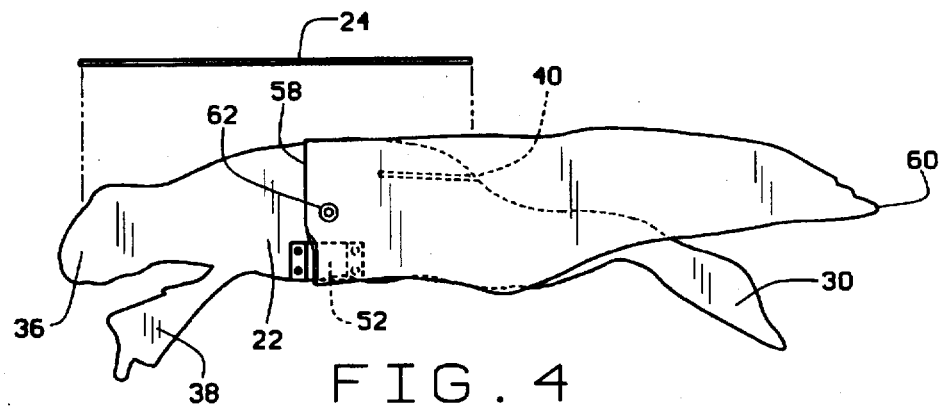
FIG. 4 is a side elevation view of the body panel and wing panels in their collapsed configuration, and the back panel.
Figure 5:
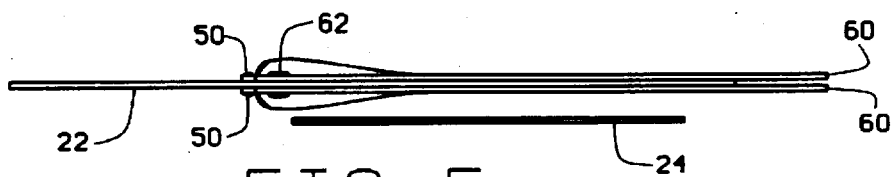
FIG. 5 is a top plan view of the body panel and wing panels in their collapsed configuration.
Figure 9:
FIG. 9 is a plan view of the left wing.
Figure 9:
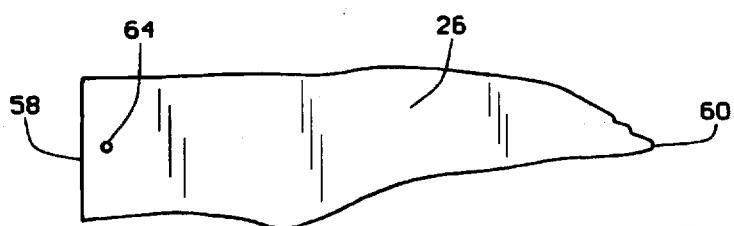

The wings 26 and 28, best shown in FIG. 9, each have a proximal end 58 and a distal end 60. The wings are adapted to extend generally outwardly from their respective sides of the body formed by interfitting the body panel 22 and back panel 24. The wings 26 and 28 are preferably pivotally mounted to the body panel 22 with a rivet 62 extending through aligned holes 64 in the wings and 66 in the body panel. The wings 26 and 28 are adapted to pivot between a collapsed or storage position in which the wings extend along the longitudinal axis of the body panel (see FIGS. 4 and 5) in an assembled or extended position in which the wing panels extend generally vertically upwardly, perpendicular to the longitudinal axis of the body panel. In the position, due to the weight and flexibility of the wing panels, the wings cantilever upwardly and outwardly from their point of attachment to the body panel, and then drape generally downwardly and outwardly, as best shown in FIG. 3. Because of the flexibility of the wing panels 26 and 28, they will actually move or flap slightly in the wind, contributing to the realism of the decoy.

OPERATION

In operation, the decoy 20 is assembled pivoting the wing panels 26 and 28 to their assembled or extended position, and allowing the wings to drape outwardly from the body panel 22 under their own weight. The slot 54 in the back panel 24 is then fit over the back 34 of the body panel 24, until the forward end of the slot is aligned with the notch. The back panel 24 is then pulled rearwardly so that the portion of the back panel in front of the slot is pulled into the notch 40. When the front end of the slot 54 engages the inner end of the notch 40, the slot 56 can be fit over the tail 36. The assembled decoy 20 can then be mounted on a pole. The socket 52 receiving the pole and mounting the decoy.

After use, the decoy 20 is quickly and easily dissembled by removing the decoy from the pole, removing the back panel 24 from the body panel 22, and then pivoting the wing panels 26 and 28 to lie generally flat against the body panel. The back panel can be stacked on the body and wing panels so that the decoy lies substantially flat, and can be conveniently carried or transferred.

What is claimed is:

1. A collapsible bird decoy comprising:
   a generally planar body panel, shaped like a side silhouette of a bird;
   a generally planar back panel, shaped like the top-silhouette of the bird, the body panel and the back panel being adapted to infit in mutually perpendicular planes to form a body which resembles the bird's body when viewed from the side or above;
   two flexible wing panels, each wing panel having a proximal end and a distal end, and each wing adapted to extend generally outwardly from one of the sides of the body formed by interfitting the body panel and back panel;
   the back panel having a central slot and a tail slot therein for receiving portions of the body panel, and the body panel having a notch therein for receiving a portion of the back panel.

2. The collapsible decoy according to claim 1 wherein the proximal ends of the wing panels are pivotally mounted to the body panel to pivot between a storage position in which the wings can extend generally along the axis of the body panel, and a use position in which the wings extend vertically upwardly and the distal ends of the wings can flex downwardly and outwardly from the body.

3. The collapsible decoy according to claim 2 further comprising a mounting socket on the body panel for releasably mounting the decoy on a pole.

4. The collapsible decoy according to claim 3 wherein the body and back panels are colored to make the decoy resemble the decoy depicted by the bird.

5. The collapsible bird decoy according to claim 1 further comprising a cutout on the body panel for releasably mounting the decoy on a pole, and two socket members, said socket members on opposite sides of the body panel and mounted over said cutout.

6. A method of assembling a collapsible bird decoy comprising:
   providing a planar body panel shaped like a side-silhouette of a bird, and having wing panels pivotally mounted thereto, to pivot, in planes parallel to the plane of the planar body panel, between a storage position in which the wings can extend generally along the length of the panel, and a use position in which the wings can extend generally vertically upwardly; and a back panel adapted to interfit with the body panel on mutually perpendicular planes;
   pivoting the wings to the use position and allowing the wings to drape generally outwardly out of the plane parallel to the plane of the planar body panel, arching generally upwardly and outwardly and then downwardly and outwardly from the body panel;
   interfitting the back panel on the body panel to form a body which resembles the bird's body when viewed from side or above.

\* \* \* \* \*